United States Patent [19]
Potter

[11] Patent Number: 5,740,419
[45] Date of Patent: Apr. 14, 1998

[54] PROCESSOR AND METHOD FOR SPECULATIVELY EXECUTING AN INSTRUCTION LOOP

[75] Inventor: Terence Matthew Potter, Austin, Tex.

[73] Assignee: International Business Machines Corporation, Armonk, N.Y.

[21] Appl. No.: 685,060

[22] Filed: Jul. 22, 1996

[51] Int. Cl.$^6$ .............................. G06F 15/82; G06F 9/32
[52] U.S. Cl. .......................................... 395/588; 395/800.23
[58] Field of Search ........................ 395/800.23, 800.24, 395/588, 580–587, 393, 381, 383, 391

[56] References Cited

U.S. PATENT DOCUMENTS

| | | | |
|---|---|---|---|
| 4,825,360 | 4/1989 | Knight | 395/676 |
| 5,056,604 | 10/1991 | Obole et al. | 395/588 |
| 5,101,484 | 3/1992 | Kohn | 395/588 |
| 5,265,253 | 11/1993 | Vamada | 395/709 |
| 5,303,355 | 4/1994 | Gergen et al. | 395/588 |
| 5,404,473 | 4/1995 | Papworth et al. | 395/588 |
| 5,454,117 | 9/1995 | Puziol et al. | 395/800.23 |
| 5,608,886 | 3/1997 | Blomgren et al. | 395/586 |
| 5,664,135 | 9/1997 | Schlansker et al. | 395/377 |

OTHER PUBLICATIONS

Farrens et al. "A Comparison of Superscalar and Decoupled Access/Execute Architecture" IEEE, 1993.

*Primary Examiner*—Larry D. Donaghue
*Attorney, Agent, or Firm*—Brian F. Russell; Andrew J. Dillon

[57] ABSTRACT

A processor and method for speculatively executing an instruction loop are disclosed. In accordance with the method, the processor initiates execution of an instruction loop and counts each executed iteration of the instruction loop. Thereafter, an actual number of iterations that the instruction loop should be executed is determined. In response to the determination, a difference between the actual number of iterations that the instruction loop should be executed and the number of executed iterations is determined. In response to a determination that the difference is greater than zero, the instruction loop is executed an additional number of iterations equal to the difference. According to one embodiment, unexecuted fetched instructions within mispredicted iterations of the instruction loop are cancelled in response to a determination that the difference is less than zero. In addition, data results of mispredicted iterations of the instruction loop that have been executed are discarded. In accordance with another embodiment, the executed iterations of the instruction loop are counted by setting a count register to zero and decrementing the count register once for each iteration of the instruction loop executed. The difference between the actual number of iterations that should be executed and the number of executed iterations is determined by adding the actual number of iterations and the value of the count register.

25 Claims, 5 Drawing Sheets

|  | ADDRESSES | INSTRUCTIONS |  |
|---|---|---|---|
| ↑ | X X X X 0 0 1 4 | store r8, r7 | 112 |
|  | X X X X 0 0 1 0 | bca B0, XX0008 | 110 |
|  | X X X X 0 0 0 C | add r8, r4, r2 | 108 |
| PROGRAM ORDER | X X X X 0 0 0 8 | add r2, r6, r8 | 106 |
|  | X X X X 0 0 0 4 | mtspr 9, r26 | 104 |
|  | X X X X 0 0 0 0 | load r26, r24, r25 | 102 |

PROCESSOR AND METHOD FOR SPECULATIVELY EXECUTING AN INSTRUCTION LOOP

BACKGROUND

1. Technical Field

The technical field of the present specification relates in general to a method and system for data processing and in particular to a processor and method for executing a branch instruction. Still more particularly, the technical field relates to a processor and method for speculatively executing an instruction loop.

2. Description of the Related Art

A state-of-the-art superscalar processor can comprise, for example, an instruction cache for storing instructions, an instruction buffer for temporarily storing instructions fetched from the instruction cache for execution, one or more execution units for executing sequential instructions, a branch processing unit (BPU) for executing branch instructions, a dispatch unit for dispatching sequential instructions from the instruction buffer to particular execution units, and a completion buffer for temporarily storing sequential instructions that have finished execution, but have not completed.

Branch instructions executed by the branch processing unit (BPU) of the superscalar processor can be classified as either conditional or unconditional branch instructions. Unconditional branch instructions are branch instructions that change the flow of program execution from a sequential execution path to a specified target execution path and which do not depend upon a condition supplied by the execution of another instruction. Thus, the branch specified by an unconditional branch instruction is always taken. In contrast, conditional branch instructions are branch instructions for which the indicated branch in program flow may be taken or not taken depending upon a condition within the processor, for example, the state of specified register bits or the value of a counter. Conditional branch instructions can be further classified as either resolved or unresolved, based upon whether or not the condition upon which the branch depends is available when the conditional branch instruction is evaluated by the branch processing unit (BPU). Because the condition upon which a resolved conditional branch instruction depends is known prior to execution, resolved conditional branch instructions can typically be executed and instructions within the target execution path fetched with little or no delay in the execution of sequential instructions. Unresolved conditional branches, on the other hand, can create significant performance penalties if fetching of sequential instructions is delayed until the condition upon which the branch depends becomes available and the branch is resolved.

Therefore, in order to enhance performance, some processors speculatively execute unresolved branch instructions by predicting whether or not the indicated branch will be taken. Utilizing the result of the prediction, the fetcher is then able to fetch instructions within the speculative execution path prior to the resolution of the branch, thereby avoiding a stall in the execution pipeline in cases in which the branch is subsequently resolved as correctly predicted.

Although most types of conditional branches are routinely predicted by the BPU, for example, utilizing static or dynamic branch prediction, "branch conditional on count" instructions, which branch based upon a value contained within a register that serves as an index of an instruction loop, are not predicted by conventional processors. If a branch conditional on count instruction is decoded by the BPU of a conventional processor, the instruction stalls until the branch index value (typically stored within a special purpose register) becomes available. Stalling the processor in this manner results in significant performance degradation, particularly when executing programs having a large number of loops. As should thus be apparent, a branch prediction methodology is needed that permits a processor to speculatively execute a branch conditional on count instruction and subsequently resolve the branch when the branch index value is determined.

SUMMARY

It is therefore one object of the present disclosure to provide a method and system for data processing.

It is another object of the present disclosure to provide a processor and method for executing a branch instruction.

It is yet another object of the present disclosure to provide a processor and method for speculatively executing an instruction loop.

The foregoing objects are achieved as is now described. A processor and method for speculatively executing an instruction loop are disclosed. In accordance with the method, the processor initiates execution of an instruction loop and counts each executed iteration of the instruction loop. Thereafter, an actual number of iterations that the instruction loop should be executed is determined. In response to the determination, a difference between the actual number of iterations that the instruction loop should be executed and the number of executed iterations is determined. In response to a determination that the difference is greater than zero, the instruction loop is executed an additional number of iterations equal to the difference. According to one embodiment, unexecuted fetched instructions within mispredicted iterations of the instruction loop are cancelled in response to a determination that the difference is less than zero. In addition, data results of mispredicted iterations of the instruction loop that have been executed are discarded. In accordance with another embodiment, the executed iterations of the instruction loop are counted by setting a count register to zero and decrementing the count register once for each iteration of the instruction loop executed. The difference between the actual number of iterations that should be executed and the number of executed iterations is determined by adding the actual number of iterations and the value of the count register.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
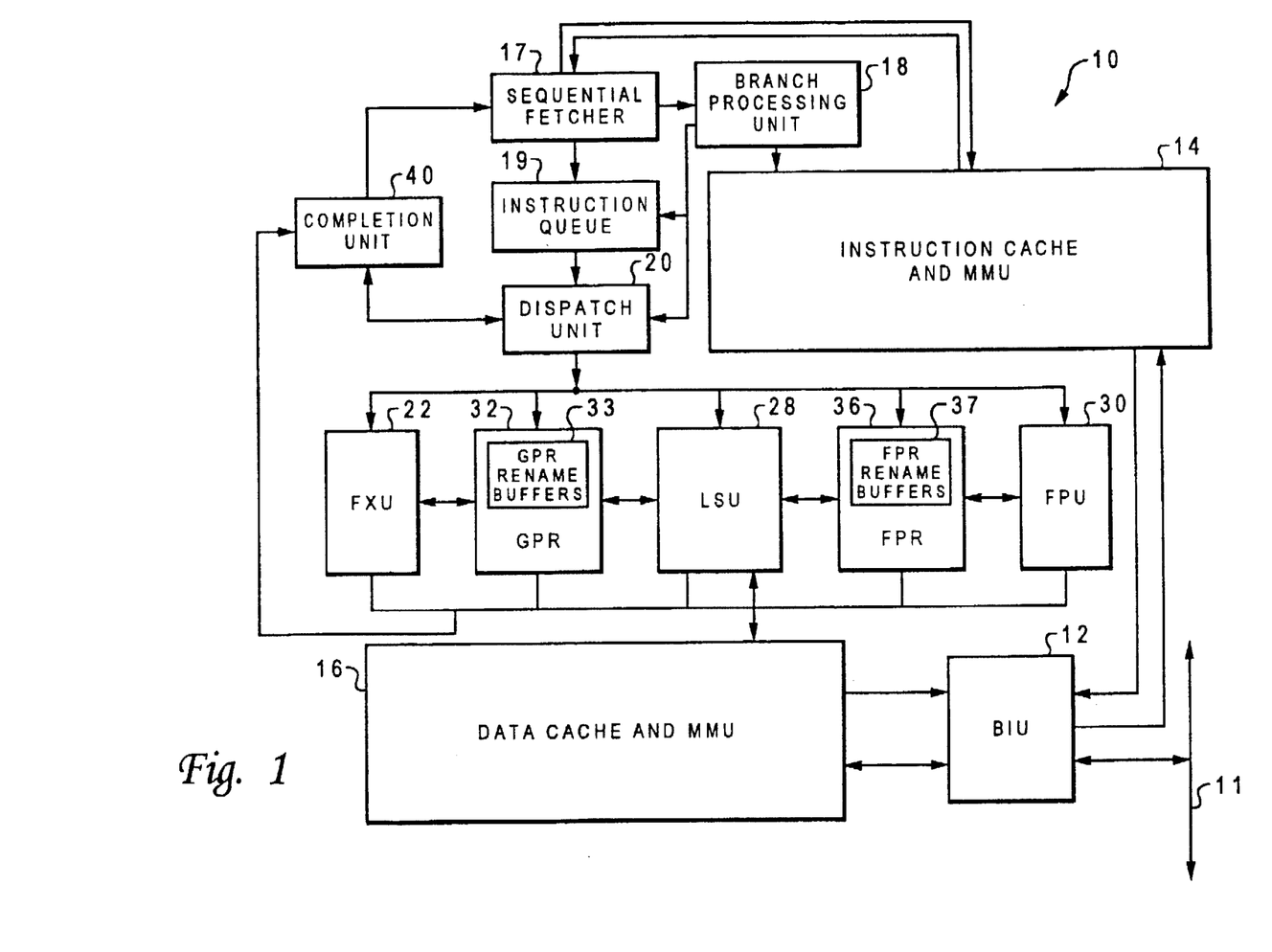
FIG. 1 depicts an illustrative embodiment of a processor, which includes facilities for speculatively executing branch conditional on count instructions.

With reference now to the figures and in particular with reference to FIG. 1, there is depicted a block diagram of an illustrative embodiment of a processor, indicated generally at 10, for processing information in accordance with the invention recited within the appended claims. In the depicted illustrative embodiment, processor 10 comprises a single integrated circuit superscalar microprocessor. Accordingly, as discussed further below, processor 10 includes various execution units, registers, buffers, memories, and other functional units, which are all formed by integrated circuitry. Processor 10 preferably comprises one of the PowerPC™ line of microprocessors available from IBM Microelectronics, which operates according to reduced instruction set computing (RISC) techniques; however, those skilled in the art will appreciate that other suitable processors can be utilized. As illustrated in FIG. 1, processor 10 is coupled to system bus 11 via a bus interface unit (BIU) within processor 10. BIU 12 controls the transfer of information between processor 10 and other devices coupled to system bus 11, such as a main memory (not illustrated). Processor 10, system bus 11, and the other devices coupled to system bus 11 together form a data processing system.

BIU 12 is connected to instruction cache 14 and data cache 16 within processor 10. High-speed caches, such as instruction cache 14 and data cache 16, enable processor 10 to achieve relatively fast access time to a subset of data or instructions previously transferred from main memory to caches 14 and 16, thus improving the speed of operation of the data processing system. Instruction cache 14 is further coupled to sequential fetcher 17, which fetches one or more instructions for execution from instruction cache 14 during each cycle. Sequential fetcher 17 transmits instructions fetched from instruction cache 14 to both branch processing unit (BPU) 18 and instruction queue 19, which decode the instructions to determine whether the instructions are branch or sequential instructions. Branch instructions are retained by BPU 18 for execution and cancelled from instruction queue 19; sequential instructions, on the other hand, are cancelled from BPU 18 and stored within instruction queue 19 for subsequent execution by other execution circuitry within processor 10. As noted above, branch instructions executed by BPU 18 can be categorized as either conditional or unconditional; conditional branch instructions can be further categorized as resolved or unresolved. Conditional branch instructions can depend upon the state of particular bits within a condition register (CR), which are set or cleared in response various conditions within the data processing system, and/or upon the value stored within a count register (CTR).

In the depicted illustrative embodiment, in addition to BPU 18, the execution circuitry of processor 10 comprises multiple execution units for sequential instructions, including fixed-point unit (FXU) 22, load-store unit (LSU) 28, and floating-point unit (FPU) 30. As is well-known to those skilled in the computer arts, each of execution units 22, 28, and 30 typically executes one or more instructions of a particular type of sequential instructions during each processor cycle. For example, FXU 22 performs fixed-point mathematical and logical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 typically performs single and double-precision floating-point arithmetic and logical operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the instructions are completed by transferring the result data from FPR rename buffers 37 to selected FPRs 36. As its name implies, LSU 28 typically executes floating-point and fixed-point instructions which either load data from memory (i.e., either data cache 16 or main memory) into selected GPRs 32 or FPRs 36 or which store data from a selected one of GPRs 32, GPR rename buffers 33, FPRs 36, or FPR rename buffers 37 to memory.

Processor 10 employs both pipelining and out-of-order execution of instructions to further improve the performance of its superscalar architecture. Accordingly, instructions can be executed opportunistically by FXU 22, LSU 28, and FPU 30 in any order as long as data dependencies are observed. In addition, instructions are processed by each of FXU 22, LSU 28, and FPU 30 at a sequence of pipeline stages. As is typical of many high-performance processors, each instruction is processed at five distinct pipeline stages, namely, fetch, decode/dispatch, execute, finish, and completion.

During the fetch stage, sequential fetcher 17 retrieves one or more instructions associated with one or more memory addresses from instruction cache 14. As noted above, sequential instructions fetched from instruction cache 14 are stored by sequential fetcher 17 within instruction queue 19, while branch instructions are removed (folded out) from the sequential instruction stream. As described below with reference to FIGS. 2–6, branch instructions are executed by BPU 18, which includes facilities that enable BPU 18 to speculatively execute unresolved branch conditional on count instructions.

During the decode/dispatch stage, dispatch unit 20 decodes and dispatches one or more instructions from instruction queue 19 to execution units 22, 28, and 30. During the decode/dispatch stage, dispatch unit 20 also allocates a rename buffer within GPR rename buffers 33 or FPR rename buffers 37 for each dispatched instruction's result data. According to a the depicted illustrative embodiment, instructions dispatched by dispatch unit 20 are also passed to a completion buffer within completion unit 40. Processor 10 tracks the program order of the dispatched instructions during out-of-order execution utilizing unique instruction identifiers.

During the execute stage, execution units 22, 28, and 30 execute sequential instructions received from dispatch unit 20 opportunistically as operands and execution resources for the indicated operations become available. Each of execution units 22, 28, and 30 are preferably equipped with a reservation station that stores instructions dispatched to that execution unit until operands or execution resources become available. After execution of an instruction has terminated, execution units 22, 28, and 30 store data results of the instruction within either GPR rename buffers 33 or FPR rename buffers 37, depending upon the instruction type. Then, execution units 22, 28, and 30 notify completion unit 40 which instructions stored within the completion buffer of completion unit 40 have finished execution. Finally, instructions are completed by completion unit 40 in program order by transferring data results of the instructions from GPR rename buffers 33 and FPR rename buffers 37 to GPRs 32 and FPRs 36, respectively.

Figure 2:
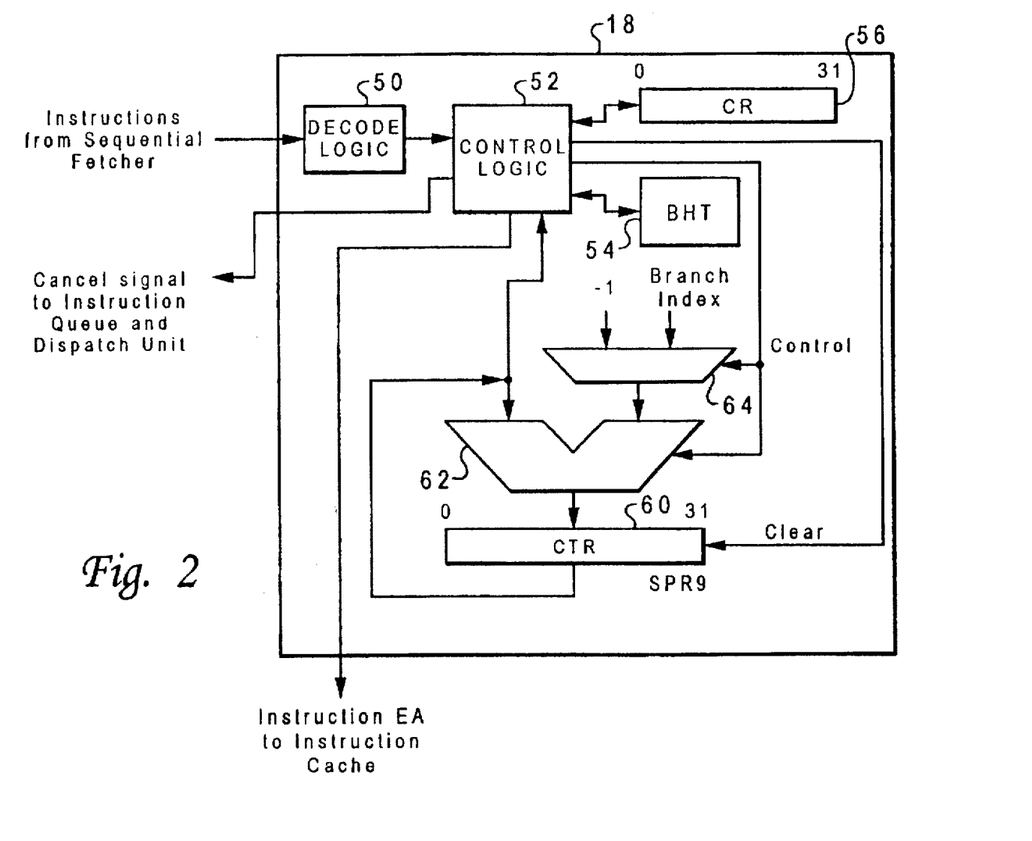
FIG. 2 depicts a more detailed block diagram of the branch processing unit within the processor illustrated in FIG. 1.

Referring now to FIG. 2, there is depicted a more detailed block diagram representation of BPU 18 within processor 10. As illustrated, BPU 18 includes decode logic 50, which decodes each instruction received by BPU 18 from sequential fetcher 17 to determine whether or not the instruction is a branch instruction, and if so, what type of branch instruction. In addition, BPU 18 includes control logic 52, which executes each branch instruction identified by decode logic 50 through calculating the effective address (EA) of a target execution path if the branch is taken or a sequential execution path if the branch is not taken. As depicted, control logic 52 is coupled to condition register (CR) 56, count register (CTR) 60, and branch history table (BHT) 54. CR 56 comprises a 32-bit register including several bits fields that are set or cleared in response to various conditions within the data processing system; thus, control logic 52 references CR 56 to resolve each branch conditional instruction that depends upon the occurrence of an event that sets or clears a bit field within CR 56. CTR 60 comprises a 32-bit register that stores a branch index value, which is referenced by control logic 52 in order to resolve branch conditional on count instructions. BHT 54 stores addresses of recently executed branch instructions in association with predictions of whether the branches specified by the branch instructions should be predicted as taken or not taken. Control logic 52 references BHT 54 to speculatively execute unresolved conditional branch instructions that depend upon the state of a bit field within CR 56.

Still referring to FIG. 2, BPU 18 further comprises adder 62 and multiplexer 64, which are utilized to execute branch conditional on count instructions. As illustrated, multiplexer 64 has a first input tied to −1 (FFFFFFFFh) and a second input, which, in response to execution of a "move to special purpose register" (mtspr) instruction, specifies a 32-bit branch index value to be loaded into CTR 60. In response to receipt of a control signal from control logic 52, the value presented at a selected input of multiplexer 64 and the value of CTR 60 are summed by adder 62 and stored within CTR 60. Thus, by clearing CTR 60 and selecting the branch index input of multiplexer 64, control logic 52 can load a 32-bit branch index value into CTR 60. Alternatively, by selecting the −1 input of multiplexer 64, control logic 52 can decrement the branch index value stored within CTR 60.

Figure 3:
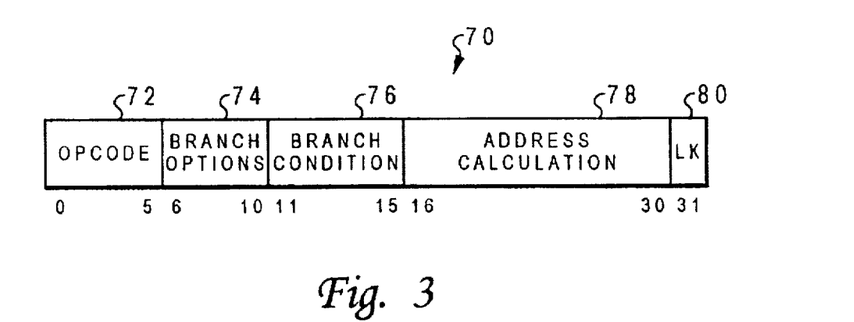
FIG. 3 illustrates an illustrative embodiment of a branch conditional on count instruction.

With reference now to FIG. 3, there is depicted at reference numeral 70 an illustrative embodiment of a branch conditional on count instruction within the instruction set of processor 10. As depicted, branch conditional on count instruction 70 comprises a 32-bit instruction having a number of fields, including opcode field 72, branch options (BO) field 74, branch condition (BC) field 76, address calculation field 78, and link field 80. Opcode field 72 uniquely identifies the instruction type of branch conditional on count instruction 70. BO field 74 specifies whether the branch will be resolved as taken or not taken in response to detection of a specified branch index value. In addition, BO field 74 indicates if the branch also depends upon a bit field of CR 56 specified within BC field 76. It is important to note that any branch instruction having a BO encoding that specifies that the indicated branch depends upon the branch index value within CTR 60 comprises a branch conditional on count instruction, regardless of whether or not the indicated branch also depends upon the state of a selected bit field within CR 56. Referring again to branch conditional on count instruction 70, address calculation field 58 specifies the target address to which execution will proceed if the branch indicated by branch conditional on count instruction 70 is taken. Finally, link field 60 indicates whether or not the fall through (next sequential) address will be loaded into a link register in response to execution of branch conditional on count instruction 50.

Figure 4:
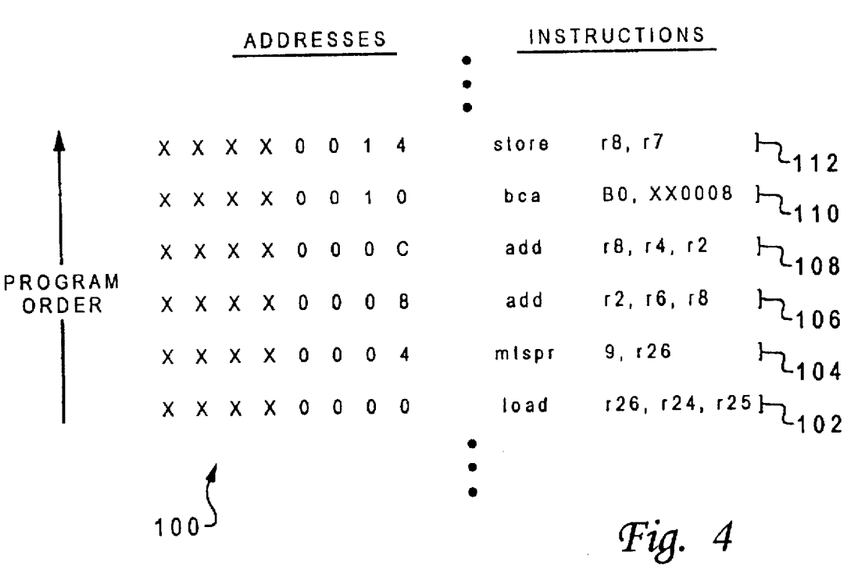
FIG. 4 depicts an exemplary instruction sequence containing a branch conditional on count instruction, which may be speculatively executed in accordance with the method illustrated in FIG. 5.

Referring now to FIG. 4, an exemplary instruction sequence is depicted that illustrates a typical use of a branch conditional on count instruction within a program. According to program order, instruction sequence 100 begins with load instruction 102 and mtspr instruction 104, which load a branch index value from register 26 within GPRs 32 into special purpose register (SPR) 9, that is, CTR 60. Next, instruction sequence 100 includes an instruction loop comprising add instructions 106 and 108 and branch conditional on count instruction 110. As indicated, branch conditional on count instruction 110 closes the instruction loop by specifying the address of add instruction 106 as the target address at which execution will continue if the branch is resolved as taken. Finally, instruction sequence 100 includes store instruction 112, which is the sequential instruction that will be executed if branch conditional on count instruction 110 is resolved as not taken.

Under a number of different execution scenarios, the branch index value upon which branch conditional on count instruction 110 depends may not be stored within CTR 60 when control logic 52 is ready to execute branch conditional on count instruction 110. For example, mtspr instruction 104 may stall until the branch index value requested by load instruction 102 is returned from main memory in response to a cache miss in data cache 16. Alternatively, the execution of load instruction 102 may simply be delayed due to a lack of available execution resources within LSU 28. In such cases, the branch specified by branch conditional on count instruction 110 cannot be resolved until the branch index value is available within CTR 60. As is described in detail below with reference to FIG. 5, processor 10, in contrast to conventional processors that stall until branch conditional on count instructions are resolved, speculatively executes unresolved branch conditional on count instructions (and the associated instruction loops) in order to enhance processor performance.

Figure 5:
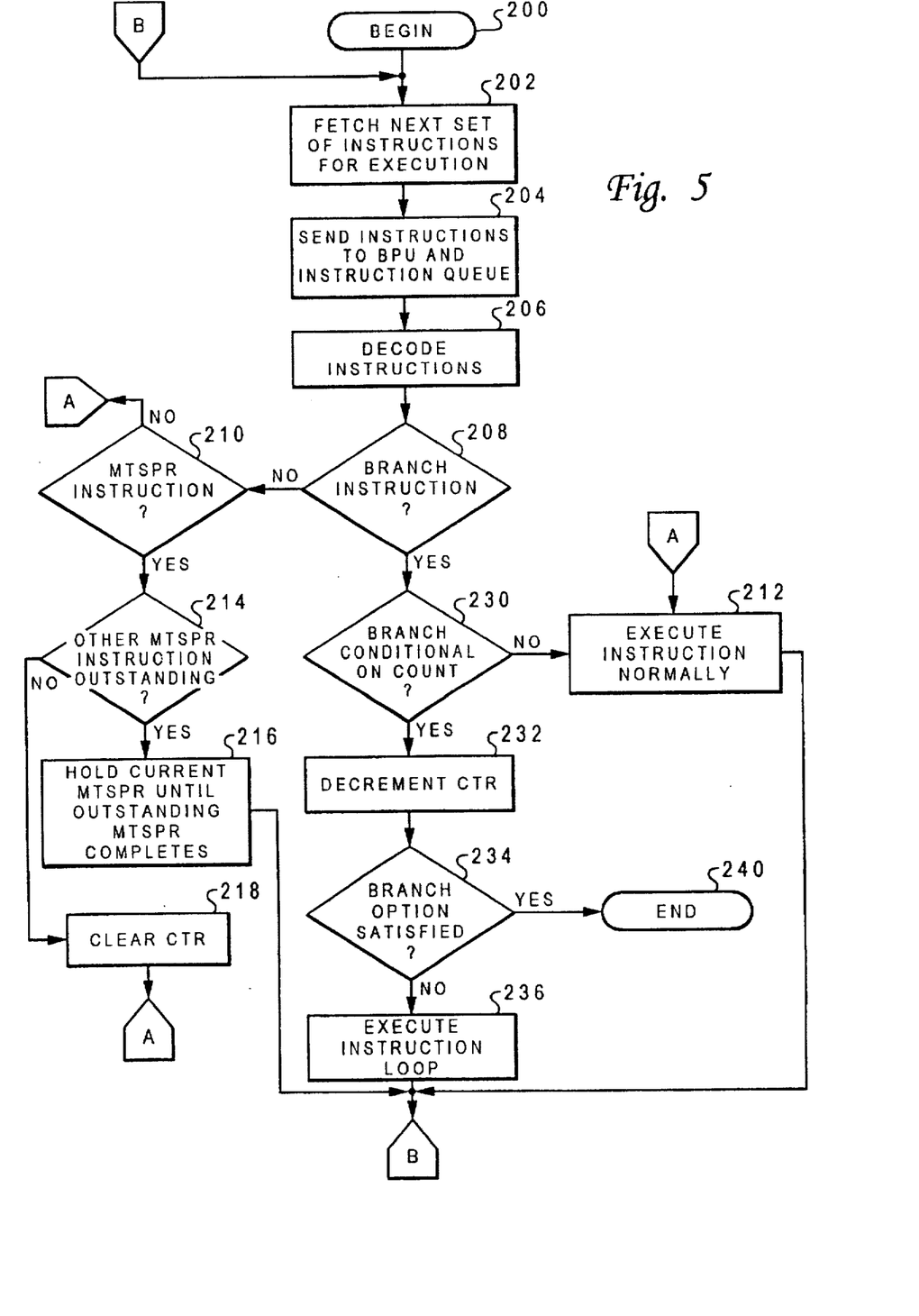
FIG. 5 is a flowchart of an illustrative embodiment of a method of speculatively executing an instruction loop including a branch conditional on count instruction.

With reference now to FIG. 5, there is illustrated a logical flowchart of an illustrative embodiment of a method of speculatively executing a branch conditional on count instruction within BPU 18. Although the logical flowchart illustrated in FIG. 5 depicts a number of sequential steps, those skilled in the art will appreciate from the following description that some of the depicted steps may be performed in parallel. The depicted method for speculatively executing a branch on count instruction will be described with reference to the exemplary instruction sequence illustrated in FIG. 4 in order to further elucidate the depicted steps.

As illustrated, the process begins at block 200 and thereafter proceeds to blocks 202 and 204. Blocks 202 and 204 depict sequential fetcher 17 retrieving the next set of sequential instructions, for example, load instruction 102 and mtspr instruction 104, from instruction cache 14 and forwarding the fetched instructions to BPU 18 and instruction queue 19. As illustrated within FIG. 2, decode logic 50 within BPU 18 receives one or more instructions each cycle from sequential fetcher 17. In response to receipt of the instructions, decode logic 50 decodes the instructions, as illustrated at block 206 of FIG. 5. The process then proceeds from block 206 to block 208, which illustrates a determination whether or not the instructions include a branch instruction. In response to a determination at block 208 that an instruction decoded by decode logic 50 is a non-branch instruction, the instruction is simply discarded by decode logic 50. However, a determination is made by dispatch unit 20 at block 210 whether or not the instruction is a mtspr instruction that loads a selected value into CTR 60. If not, the process passes through page connector A to block 212, which depicts the normal execution of the instruction by one of processing units 22, 28, and 30. Thus, for example, referring to FIG. 4, load instruction 102 is discarded by BPU 18, but is dispatched by dispatch unit 20 to LSU 28 for execution. Similarly, add instructions 106 and 108 are discarded by BPU 18, but are dispatched to FXU 22 for execution. Thereafter, the process returns to block 202 through page connector B.

Returning to block 210, if a determination is made that an instruction is a mtspr instruction that loads a selected value into CTR 60, a further determination is made by dispatch unit 20 at block 214 whether or not another mtspr instruction targeting CTR 60 has been dispatched but has not completed. The determination illustrated at block 214 can be made, for example, by searching the completion buffer within completion unit 40 for a mtspr instruction. In response to a determination that an uncompleted mtspr instruction targets CTR 60, the process passes to block 216, which depicts dispatch unit 20 holding the decoded mtspr instruction in instruction queue 19 until the previously dispatched mtspr instruction completes in order to prevent a branch index value within CTR 60 from being overwritten. The process then returns to block 202 through page connector B.

However, in response to a determination at block 214 that no other mtspr instruction targeting CTR 60 is outstanding, the process proceeds to block 218, which illustrates dispatch unit 20 signalling control logic 52 to clear CTR 60. Clearing CTR 60 serves two alternative purposes. In cases in which the mtspr instruction and branch conditional on count instruction are executed in program order (i.e., the branch is executed non-speculatively), clearing CTR 60 permits the branch index value upon which the branch conditional on count instruction depends to be loaded into CTR 60 through adder 62, which sums the current value of CTR 60 and the branch index value. Alternatively, in cases in which an unresolved branch conditional on count instruction is decoded by BPU 18, the depicted embodiment of BPU 18 always predicts the branch conditional on count instruction as taken, thereby permitting the speculative execution of the associated instruction loop. Thus, because control logic 52 decrements CTR 60 prior to determining whether or not the value of CTR 60 satisfies the branch option specified by the branch conditional on count instruction, clearing CTR 60 in response to a detection of a mtspr instruction sets the value within CTR 60 to a maximum number of iterations of the instruction loop that can be speculatively executed. In addition, by clearing CTR 60 prior to speculative execution of the branch conditional on count instruction, the value within CTR 60 specifies a two's complement representation of the number of iterations of the branch conditional on count instruction and associated instruction loop that are speculatively executed prior to resolution of the branch conditional on count instruction. Referring again to block 218, the process passes from block 218 through page connector A to block 212, which depicts executing the mtspr instruction as execution resources and operands become available.

Figure 6:
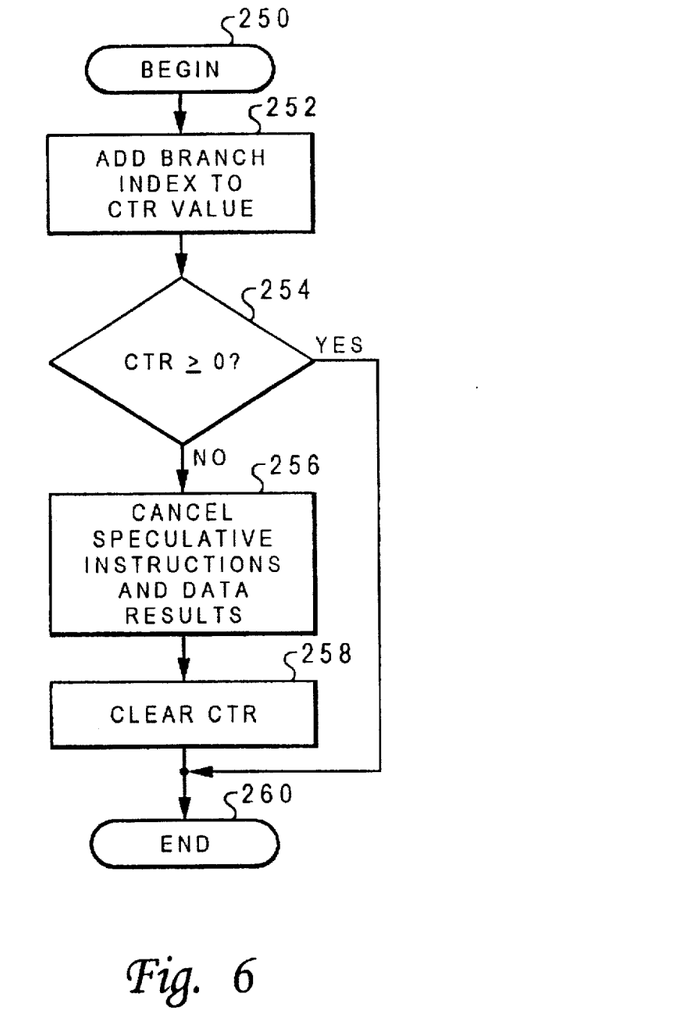
FIG. 6 is a flowchart of a method for updating the value within the count register (CTR) depicted in FIG. 2 in response to a determination of a branch index.

Referring now to FIG. 6, there is depicted a flowchart of a method of updating CTR 60 in response to the execution of a mtspr instruction. As illustrated, the process begins at block 250 in response to receipt of a branch index value by BPU 18. Thereafter, the process proceeds to block 252, which depicts control logic 52 adding the branch index value to the two's complement value stored within CTR 60. A determination is then made at block 254 whether or not the value of CTR 60 is greater than or equal to zero. If the value is greater than or equal to zero, indicating either that the branch conditional on count instruction has not been executed or that the branch conditional on count instruction has been speculatively executed fewer times than were specified by the branch index value, the process passes to block 260 and terminates. In either case, if the value of CTR 60 is greater than zero, nonspeculative execution of the instruction loop continues in accordance with the method illustrated in FIG. 5 until the specified branch option is satisfied.

Returning to block 256, if a determination is made by control logic 52 that the value stored within CTR 60 is less than zero, indicating that at least one iteration of the branch conditional on count instruction was mispredicted, the process proceeds to block 256. Block 256 depicts BPU 18 cancelling instructions within mispredicted iterations of the instruction loop from instruction queue 19, execution units 22, 28, and 30, and the completion buffer within completion unit 40. In addition, data results of speculatively executed instructions within mispredicted iteration of the instruction loop are discarded from GPR rename buffers 33 and FPR rename buffers 37. The process then proceeds to block 258, which illustrates control logic 52 clearing CTR 60, and thereafter terminates at block 260.

Referring again to block 208 of FIG. 5, if a determination is made that an instruction decoded by decode logic 50 is a branch instruction, a further determination is made whether or not the branch instruction is a branch conditional on count instruction, as depicted at block 230. If not, the process proceeds from block 220 to block 212, which illustrates executing the branch instruction normally. Thus, for example, in response to receipt of an unconditional branch instruction from decode logic 50, control logic 52 simply calculates the effective address (EA) of the target instruction path indicated by the branch instruction and transmits the EA to instruction cache 14. However, in response to receipt of a conditional branch instruction that depends upon the state of bits within condition register (CR) 56, control logic 52 first attempts to resolve the branch by examining the specified bit field within CR 56. If the CR bit field upon which the conditional branch instruction depends are not available, control logic 52 predicts the specified branch utilizing BHT 54. Thereafter, control logic 52 calculates the EA of the target speculative execution path and transmits the EA to instruction cache 14.

Returning to block 230, if a determination is made by decode logic 50 that a fetched instruction is a branch conditional on count instruction, for example, branch conditional on count instruction 110, the process proceeds to block 232, which illustrates control logic 52 decrementing the value stored in CTR 60. Next, at block 234 a determination is made whether or not the value stored within CTR 60 satisfies the branch option encoded in BO field 74 of the branch conditional on count instruction (e.g., whether the branch index value equals 0). If the branch option of the branch conditional on count instruction is not satisfied, the process proceeds to block 236, which depicts executing another iteration of the instruction loop. The process then returns to block 202 through page connector B in the manner which has been described. However, if a determination is made at block 234 that the branch index value stored within CTR 60 satisfies the specified branch option, the process passes to block 240, where execution of the instruction loop including the branch conditional on count instruction terminates.

A processor and method for speculatively executing an instruction loop closed by a branch conditional on count instruction have been described. The processor and method provide enhanced performance over conventional processor which stall in response to unresolved branch conditional on count instructions. Furthermore, the processor and method provide an efficient mechanism for recovering from the execution of mispredicted iterations of the instruction loop. While the processor and method have been described with reference to the execution of an instruction loop closed by a branch conditional on count instruction, those skilled in the art will appreciate that the concepts described with reference to the disclosed illustrative embodiments may be extended to architectures which do not contain special instruction constructs for controlling loop iterations.

While an illustrative embodiment has been particularly shown and described, it will be understood by those skilled in the art that various changes in form and detail may be made therein without departing from the spirit and scope of the illustrative embodiment.

What is claimed is:

1. A method within a processor of speculatively executing an instruction loop, comprising:
   initiating execution of said instruction loop and counting each executed iteration of said instruction loop;
   thereafter, determining an actual number of iterations that said instruction loop should be executed;
   in response to said determination, determining a difference between said actual number of iterations and a number of executed iterations of said instruction loop; and
   in response to a determination that said difference is greater than zero, executing said instruction loop an additional number of iterations equal to said difference.

2. The method of claim 1, said instruction loop including a conditional branch instruction, wherein said conditional branch instruction is resolved in response to said determination of said actual number of iterations.

3. The method of claim 1, wherein said processor includes a count register, said method further comprising the step of predicting a number of iterations that said instruction loop will be executed and storing said prediction within said count register.

4. The method of claim 1, said processor including a count register, wherein said step of counting each executed iteration of said instruction loop comprises maintaining said number of executed iterations within said count register.

5. The method of claim 4, wherein said step of maintaining said number of executed iterations within said count register comprises setting said count register to zero and decrementing said count register once for each iteration of said instruction loop executed.

6. The method of claim 5, wherein said step of determining a difference comprises adding said actual iteration value to a value within said count register.

7. The method of claim 1, wherein said step of determining an actual number of iterations that said instruction loop should be executed comprises executing an instruction that supplies said actual number of iterations.

8. The method of claim 1, said method further comprising:
   in response to a determination that said difference is less than zero, cancelling unexecuted instructions within mispredicted iterations of said instruction loop.

9. The method of claim 8, and further comprising:
   discarding data results of mispredicted iterations of said instruction loop.

10. A processor, comprising:
    one or more execution units for executing instructions, wherein said one or more execution units initiate execution of an instruction loop while an actual number of iterations of said instruction loop to be executed is unknown;
    means for counting a number of executed iterations of said instruction loop; and
    means, responsive to a determination of said actual number of iterations, for determining a difference between said actual number of iterations and said number of executed iterations;
    wherein said execution units execute said instruction loop an additional number of iterations equal to said difference in response to a determination that said difference is zero or greater.

11. The processor of claim 8, wherein said means for counting a number of executed iterations comprises a count register.

12. The processor of claim 11, said processor further comprising means for predicting a number of iterations that said instruction loop will be executed, wherein said means for predicting stores said prediction within said count register.

13. The processor of claim 11, and further comprising means for decrementing said count register once for each iteration of said instruction loop executed.

14. The processor of claim 13, wherein said means for determining a difference comprises means for adding said actual number of iterations to a value within said count register.

15. The processor of claim 10, wherein said determination of said actual number of iterations is made in response to execution of an instruction by said one or more execution units.

16. The processor of claim 10, wherein said processor further comprises:
    a fetcher for fetching instructions for execution;
    a queue for temporarily storing fetched instructions prior to execution, wherein instructions within mispredicted iterations of said instruction loop are cancelled out of said queue in response to a determination that said difference is less than zero.

17. The processor of claim 16, and further comprising:
    one or more registers for temporarily storing data results of instructions, wherein data results of instructions within mispredicted iterations of said instruction loop are discarded from said one or more registers.

18. A data processing system, comprising:
    a memory for storing instructions;
    a fetcher for fetching instructions within an instruction loop from said memory for execution;

one or more execution units for executing instructions, wherein said one or more execution units begin execution of an instruction loop while an actual number of iterations of said instruction loop to be executed is unknown;

means for counting a number of executed iterations of said instruction loop; and means, responsive to a determination of said actual number of iterations, for determining a difference between said actual number of iterations and said number of executed iterations;

wherein said execution units execute said instruction loop an additional number of iterations equal to said difference in response to a determination that said difference is zero or greater.

19. The data processing system of claim 18, wherein said means for counting a number of executed iterations comprises a count register.

20. The data processing system of claim 19, said data processing system further comprising means for predicting a number of iterations that said instruction loop will be executed, wherein said means for predicting stores said prediction within said count register.

21. The data processing system of claim 19, and further comprising means for decrementing said count register once for each iteration of said instruction loop executed.

22. The data processing system of claim 21, wherein said means for determining a difference comprises means for adding said actual number of iterations to a value within said count register.

23. The data processing system of claim 18, wherein said determination of said actual number of iterations is made in response to execution of an instruction by said one or more execution units.

24. The data processing system of claim 18, wherein said data processing system further comprises:

a queue for temporarily storing fetched instructions prior to execution, wherein instructions within mispredicted iterations of said instruction loop are cancelled out of said queue.

25. The data processing system of claim 24, and further comprising:

one or more registers for temporarily storing data results of instructions, wherein data results of instructions within mispredicted iterations of said instruction loop are discarded from said one or more registers.

* * * * *